(12) United States Patent
Ren et al.

(10) Patent No.: US 11,038,576 B2
(45) Date of Patent: *Jun. 15, 2021

(54) PHASE TRACKING REFERENCE SIGNAL SENDING METHOD AND APPARATUS

(71) Applicant: HUAWEI TECHNOLOGIES CO., LTD., Guangdong (CN)

(72) Inventors: Haibao Ren, Shanghai (CN); Yi Qin, Shanghai (CN); Xi Zhang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/526,379

(22) Filed: Jul. 30, 2019

(65) Prior Publication Data

US 2019/0356374 A1 Nov. 21, 2019

Related U.S. Application Data

(63) Continuation of application No. 16/144,497, filed on Sep. 27, 2018, now Pat. No. 10,419,099, which is a (Continued)

(30) Foreign Application Priority Data

Nov. 17, 2017 (CN) .......................... 201711148028.X

(51) Int. Cl.
*H04B 7/02* (2018.01)
*H04B 7/06* (2006.01)
(Continued)

(52) U.S. Cl.
CPC ......... *H04B 7/0663* (2013.01); *H04B 7/0456* (2013.01); *H04B 7/0486* (2013.01);
(Continued)

(58) Field of Classification Search
CPC .. H04B 7/0663; H04B 7/0456; H04B 7/0691; H04B 7/0634; H04B 7/0486;
(Continued)

(56) References Cited

U.S. PATENT DOCUMENTS 9,787,379 B2   10/2017 Onggosanusi et al.
10,419,099 B2 *  9/2019 Ren ..................... H04L 25/0204
(Continued)

FOREIGN PATENT DOCUMENTS

CN        102158302 A      8/2011
CN        102332945 A      1/2012
(Continued)

OTHER PUBLICATIONS

"Samsung,""DL PT-RS design"",3GPP TSG RAN WG1 #90 R1-1703605,Prague, Czech, Aug. 21-25, 2017, total 5 pages."
(Continued)

*Primary Examiner* — Dhaval V Patel
(74) *Attorney, Agent, or Firm* — David William Roe

(57) ABSTRACT

This application provides a phase tracking reference signal (PTRS) sending method and apparatus. The method includes: implicitly determining, by a terminal device based on obtained uplink grant information and a preset rule, a to-be-sent PTRS and an antenna port for carrying the to-be-sent PTRS, where the antenna port is selected from an antenna port set, and the to-be-sent PTRS is one or more of all available PTRSs; and putting the to-be-sent PTRS on the antenna port, and sending the to-be-sent PTRS on the antenna port. This implicit indication method can effectively reduce air interface signaling overheads and improve air interface efficiency.

29 Claims, 5 Drawing Sheets

Related U.S. Application Data continuation of application No. PCT/CN2018/094478, filed on Jul. 4, 2018.

(51) Int. Cl.
*H04B 7/0456* (2017.01)
*H04W 72/14* (2009.01)
*H04L 25/02* (2006.01)
*H04L 5/00* (2006.01)

(52) U.S. Cl.
CPC ......... *H04B 7/0634* (2013.01); *H04B 7/0691* (2013.01); *H04L 5/0051* (2013.01); *H04L 25/0224* (2013.01); *H04W 72/14* (2013.01)

(58) Field of Classification Search
CPC .. H04W 72/14; H04L 25/0224; H04L 5/0051; H04L 25/0204
See application file for complete search history.

(56) References Cited

U.S. PATENT DOCUMENTS

| | | |
|---|---|---|
| 2012/0182889 A1 | 7/2012 | Saund et al. |
| 2014/0321406 A1 | 10/2014 | Marinier et al. |
| 2014/0328261 A1 | 11/2014 | Sampath et al. |
| 2016/0211902 A1 | 7/2016 | Park et al. |
| 2018/0287759 A1 | 10/2018 | Kundargi et al. |
| 2018/0317225 A1 | 11/2018 | Akkarakaran et al. |
| 2020/0204225 A1* | 6/2020 | Huang ................. H04B 7/0469 |
| 2020/0220680 A1* | 7/2020 | Yamada ............... H04B 7/0413 |

FOREIGN PATENT DOCUMENTS

| | | |
|---|---|---|
| CN | 103428749 A | 12/2013 |
| CN | 104346404 A | 2/2015 |
| CN | 105191482 A | 12/2015 |
| CN | 106656292 A | 5/2017 |
| CN | 107046459 A | 8/2017 |
| CN | 107302796 A | 10/2017 |
| WO | 2017123018 A1 | 7/2001 |
| WO | 2017138871 A1 | 8/2017 |

OTHER PUBLICATIONS

Nokia et al.,"Discussion on PT-RS design for CP-OFDM",3GPP TSG RAN WG1 NR Ad-Hoc#2 R1-1711308,Qingdao, P.R. China, Jun. 27-30, 2017,total 10 pages.

Nokia et al.,"On remaining details of PT-RS design",3GPP TSG RAN WG1 #90bis R1-1718517,Prague, Czech Republic, Oct. 9-13, 2017,total 10 pages.

3GPP TS 38.211 V1.0.0 (Sep. 2017),3rd Generation Partnership Project;Technical Specification Group Radio Access Network;NR;Physical channels and modulation(Release 15),total 37 pages.

3GPP TS 38.212 V1.0.0 (Sep. 2017),3rd Generation Partnership Project;Technical Specification Group Radio Access Network;NR;Multiplexing and channel coding(Release 15),total 28 pages.

3GPP TS 38.214 V1.0.0 (Sep. 2017),3rd Generation Partnership Project;Technical Specification Group Radio Access Network;NR;Physical layer procedures for data (Release 15),total 32 pages.

R1-1704240 Huawei, HiSilicon,"Further details for PT-RS design",3GPP TSG RAN WG1 Meeting #88b,Spokane, USA, Apr. 3-7, 2017,total 5 pages.

R1-1721664 vivo et al.,"WF on UL PTRS Port Indication",RAN1#91, Reno, US,, Oct. 2017,total 8 pages.

R1-1717434 ZTE, Sanechips,"Remaining details on PT-RS",3GPP TSG RAN WG1 Meeting 90bis,Prague, CZ, Oct. 9-13, 2017,total 7 pages.

R1-1703605 Samsung,"DL PT-RS design",3GPP TSG RAN WG1 #90,Prague, Czech, Aug. 21-25, 2017,total 5 pages.

Qualcomm Incorporated,"UL data transmission procedures", 3GPP TSG RAN WG1 Meeting 91, R1-1720690, Reno, USA, Nov. 27-Dec. 1, 2017, total 6 pages.

CATT,"Further discussion on phase tracking for UL", 3GPP TSG RAN WG1 AH_NR Meeting, R1-1700233, Spokane, USA, Jan. 16-20, 2017, total 3 pages.

* cited by examiner

PHASE TRACKING REFERENCE SIGNAL SENDING METHOD AND APPARATUS

CROSS-REFERENCE TO RELATED APPLICATIONS

This application is a continuation of U.S. patent application Ser. No. 16/144,497, filed on Sep. 27, 2018, which is a continuation of International Application No. PCT/CN2018/094478, filed on Jul. 4, 2018, which claims priority to Chinese Patent Application No. 201711148028.X, filed on Nov. 17, 2017. All of the afore-mentioned patent applications are hereby incorporated by reference in their entireties.

TECHNICAL FIELD

This application relates to the field of communications technologies, and in particular, to a phase tracking reference signal (PTRS) sending method and apparatus.

BACKGROUND

In an existing wireless communications network (such as a 2G, 3G, or 4G network, where G is short for generation), operating frequency bands of communications systems are all in a frequency range below 6 GHz. Available operating frequency bands in this frequency range are strained, and an increasing communication requirement cannot be met. On the other hand, there are a large quantity of frequency bands not fully utilized in a frequency range above 6 GHz. Therefore, a future (for example, 5G) wireless communications network whose operating frequency band is above 6 GHz is under research and development in the industry, to provide an ultrafast data communications service. In the frequency range above 6 GHz, frequency bands at 28 GHz, 39 GHz, 60 GHz, 73 GHz, and the like are available for a next-generation wireless communications network. Because an operating frequency band of the next-generation wireless communications network is above 6 GHz, the next-generation wireless communications network has significant features of a high-frequency communications system, such as a high-bandwidth and highly integrated antenna array, and a relatively high throughput is easy to achieve. However, compared with the existing wireless communications network, the next-generation wireless communications network operating in a range above 6 GHz is subject to severer intermediate radio frequency distortion, especially impact caused by phase noise (PHN). In addition, a Doppler effect and a central frequency offset (CFO) have greater impact on performance of the high-frequency communications system as a frequency band increases. The phase noise, the Doppler effect, and the CFO have one thing in common, that is, a phase error is introduced into data reception in the high-frequency communications system, and therefore the high-frequency communications system is degraded in performance or even cannot operate.

Using the phase noise as an example, with an increase in a frequency band, a phase noise level increases by 20*log (f1/f2) dB. Using a 2 GHz frequency band and a 28 GHz frequency band as an example, a phase noise level of the 28 GHz frequency band is 23 dB higher than that of the 2 GHz frequency band. A higher phase noise level causes a larger phase error, and then has greater impact on a signal.

A reference signal is a to-be-sent signal to which a known pilot symbol is added by a transmit end, and a receive end performs a specific function based on information about the known pilot symbol. A most common method for phase noise estimation is estimating a phase error by using an inserted phase tracking reference signal (PTRS).

Because of physical features of the phase noise, PTRS design usually has the following features:

The phase noise randomly changes in time, and a coherence time is relatively short. In the phase tracking reference signal design, the coherence time may be understood as a quantity of consecutive orthogonal frequency division multiplexing (OFDM) symbols that have same phase noise. Therefore, a reference signal for phase noise estimation usually needs to have relatively high time-domain density. In addition, there are different requirements for time-domain density of the PTRS under different transmission conditions.

The phase noise is generated due to non-ideality of a local oscillator. Different antenna ports that have a same local oscillator have same phase noise. Demodulation reference signal (DMRS) antenna ports physically connected to a same local oscillator have same phase noise. One antenna port corresponds to one DMRS port. Therefore, only one PTRS antenna port needs to be configured for the plurality of DMRS antenna ports that have the same local oscillator, to carry a PTRS. Phase noise on this group of DMRS antenna ports can be estimated by using the PTRS sent on the PTRS antenna port.

With development of communications technologies, a plurality of local oscillators may be used to form an antenna port set. This means that different PTRSs need to be used. How to select a proper PTRS becomes a new task.

SUMMARY

This application provides a phase tracking reference signal (PTRS) sending method and apparatus.

According to a first aspect, this application provides a phase tracking reference signal PTRS sending method, including obtaining, by a terminal device, uplink grant information, determining, by the terminal device based on the uplink grant information and a preset rule, a to-be-sent PTRS and an antenna port for carrying the to-be-sent PTRS, where the antenna port is selected from an antenna port set, and the to-be-sent PTRS is one or more of all available PTRSs, and putting, by the terminal device, the to-be-sent PTRS on the antenna port, and sending the to-be-sent PTRS.

According to the method in this aspect, a quantity of to-be-sent PTRSs and antenna ports for carrying the PTRSs are implicitly obtained based only on the preset rule and control information, such as precoding and/or a rank, in the uplink grant information, and no explicit indication signaling is required. This effectively reduces control signaling overheads and improves air interface transmission efficiency.

In a possible design, before the terminal device determines, based on the uplink grant information and the preset rule, the to-be-sent PTRS and the antenna port for carrying the to-be-sent PTRS, the terminal device determines a quantity of to-be-sent PTRSs.

In a possible design, the antenna port set is a scheduling antenna port set.

In a possible design, the uplink grant information includes precoding codeword information; and the preset rule includes the following: each column of a precoding codeword corresponding to the precoding codeword information and each antenna port in the antenna port set are in a one-to-one correspondence, and antenna ports in the antenna port set that correspond to columns in which non-zero elements in a same row of the precoding codeword are located correspond to a same to-be-sent PTRS.

In a possible design, the columns in which the non-zero elements in the same row of the precoding codeword are located belong to a same group, and the group and the to-be-sent PTRS are in a one-to-one correspondence.

In a possible design, the uplink grant information includes precoding codeword information; and the preset rule includes the following: each row of a precoding codeword corresponding to the precoding codeword information and each antenna port in the antenna port set are in a one-to-one correspondence, and if there is more than one non-zero element in a same row of the precoding codeword, sending antenna ports corresponding to rows in which all non-zero elements in columns of the more than one non-zero element are located correspond to a same PTRS.

In a possible design, rows in which non-zero elements in a same column of the precoding codeword are located belong to a same group, and the group and the to-be-sent PTRS are in a one-to-one correspondence.

In a possible design, the precoding codeword is one codeword in a codebook subset restriction CBSR.

In a possible design, the uplink grant information includes rank information, and a value of the rank is R; and the preset rule is that the quantity of to-be-sent PTRSs is min(R, C), min(S, C), or min(Q, C), where C is a maximum quantity of PTRSs supported by the terminal device or a maximum quantity of PTRSs configured by a network device for the terminal device, S is a minimum quantity of PTRSs supported by the terminal device when R is given, Q is a maximum quantity of PTRSs supported by the terminal device when R is given, and C, R, S, and Q are positive integers.

In a possible design, any PTRS in all the available PTRSs corresponds to two or more antenna ports in the antenna port set, and antenna ports corresponding to any two different PTRSs are completely different.

In a possible design, a correspondence manner in which any PTRS in all the available PTRSs corresponds to two or more antenna ports in the antenna port set is notified by using higher layer signaling or downlink control signaling or is preset.

In a possible design, an antenna port, in the antenna ports corresponding to the any PTRS, that is configured to send the any PTRS is notified by using higher layer signaling or downlink control signaling or is preset.

In a possible design, the preset rule is notified by using higher layer signaling or downlink control signaling or is preset.

In a possible design, before the terminal device obtains the uplink grant information, the terminal device sends, to the network device, a correspondence between all the available PTRSs and antenna ports in the antenna port set.

In a possible design, the uplink grant information includes X bits, and the X bits are used to indicate a number of the antenna port for carrying the to-be-sent PTRS or a number of a DMRS port associated with the PTRS. Indication manners are different for different quantities of to-be-sent PTRSs.

In a possible design, the PTRS sending method may be implemented by using hardware, for example, implemented by using a circuit or one or more integrated circuits. Alternatively, the PTRS sending method may be implemented by using software. For example, one or more processors perform the PTRS sending method by reading an instruction stored in a memory. The one or more processors may be integrated on one chip, or may be distributed on a plurality of chips. Alternatively, the PTRS sending method may be implemented by using a combination of hardware and software. For example, a processor performs the step of "determining a to-be-sent PTRS" by reading an instruction stored in a memory, while the step of "sending the to-be-sent PTRS" is performed by using a logic circuit or an accelerator. Certainly, during specific implementation, a person skilled in the art may also use a combination of the foregoing manners.

According to a second aspect, this application provides a PTRS sending apparatus, including: an obtaining module, configured to obtain uplink grant information a determining module, configured to determine, based on the uplink grant information and a preset rule, a to-be-sent PTRS and an antenna port for carrying the to-be-sent PTRS, where the antenna port is selected from an antenna port set, and the to-be-sent PTRS is one or more of all available PTRSs, and a sending module, configured to put the to-be-sent PTRS on the antenna port, and send the to-be-sent PTRS.

In a possible design, before determining, based on the uplink grant information and the preset rule, the to-be-sent PTRS and the antenna port for carrying the to-be-sent PTRS, the determining module is further configured to determine a quantity of to-be-sent PTRSs.

In a possible design, the antenna port set is a scheduling antenna port set.

In a possible design, the uplink grant information includes precoding codeword information; and the preset rule includes the following: each column of a precoding codeword corresponding to the precoding codeword information and each antenna port in the antenna port set are in a one-to-one correspondence, and antenna ports in the antenna port set that correspond to columns in which non-zero elements in a same row of the precoding codeword are located correspond to a same to-be-sent PTRS.

In a possible design, the columns in which the non-zero elements in the same row of the precoding codeword are located belong to a same group, and the group and the to-be-sent PTRS are in a one-to-one correspondence.

In a possible design, the uplink grant information includes precoding codeword information; and the preset rule includes the following: each row of a precoding codeword corresponding to the precoding codeword information and each antenna port in the antenna port set are in a one-to-one correspondence, and if there is more than one non-zero element in a same row of the precoding codeword, sending antenna ports corresponding to rows in which all non-zero elements in columns of the more than one non-zero element are located correspond to a same PTRS.

In a possible design, rows in which non-zero elements in a same column of the precoding codeword are located belong to a same group, and the group and the to-be-sent PTRS are in a one-to-one correspondence.

In a possible design, the precoding codeword is one codeword in a codebook subset restriction CBSR.

In a possible design, the uplink grant information includes rank information, and a value of the rank is R; and the preset rule is that the quantity of to-be-sent PTRSs is min(R, C), min(S, C), or min(Q, C), where C is a maximum quantity of PTRSs supported by the apparatus or a maximum quantity of PTRSs configured by a network device for the apparatus, S is a minimum quantity of PTRSs supported by the apparatus when R is given, Q is a maximum quantity of PTRSs supported by the apparatus when R is given, and C, R, S, and Q are positive integers.

In a possible design, any PTRS in all the available PTRSs corresponds to two or more antenna ports in the antenna port set, and antenna ports corresponding to any two different PTRSs are completely different.

In a possible design, a correspondence manner in which any PTRS in all the available PTRSs corresponds to two or more antenna ports in the antenna port set is notified by using higher layer signaling or downlink control signaling or is preset.

In a possible design, an antenna port, in the antenna ports corresponding to the any PTRS, that is configured to send the any PTRS is notified by using higher layer signaling or downlink control signaling or is preset.

In a possible design, the preset rule is notified by using higher layer signaling or downlink control signaling or is preset.

In a possible design, before the obtaining module obtains the uplink grant information, the sending module is further configured to send, to the network device, a correspondence between all the available PTRSs and antenna ports in the antenna port set.

In a possible design, the uplink grant information includes X bits, and the X bits are used to indicate a number of the antenna port for carrying the to-be-sent PTRS. Manners of the indication are different for different quantities of to-be-sent PTRSs.

In a possible design, the apparatus is a terminal device.

For a beneficial effect of the PTRS sending apparatus provided in the second aspect and the possible designs of the second aspect, refer to the beneficial effect in the first aspect and the possible implementations of the first aspect. Details are not described herein again.

According to a third aspect, this application provides a PTRS sending apparatus, including a processor, where the processor is configured to invoke a program instruction in a memory to perform the PTRS sending method in any one of the first aspect and the possible designs of the first aspect.

In a possible design, the apparatus further includes the memory, where the memory is configured to store the program instruction.

The memory may be located inside the processor or outside the processor. The processor may be integrated in a terminal device or a base station.

The processor may be a circuit, one or more integrated circuits, or one or more dedicated chips, or the processor may be a general-purpose chip. The foregoing PTRS sending function can be implemented by loading a program instruction used to implement the PTRS sending method to the processor. Alternatively, the processor may be one or a combination of a circuit, an integrated circuit, a dedicated chip, and a general-purpose chip.

In a possible design, the apparatus is a terminal device.

According to a fourth aspect, this application provides a PTRS sending apparatus, including an input interface, configured to obtain uplink grant information, a logic circuit, configured to perform, based on the obtained uplink grant information, the method in the first aspect and the possible designs of the first aspect, to obtain a to-be-sent PTRS, and an output interface, configured to output the PTRS.

In a possible design, the apparatus is a terminal device.

According to a fifth aspect, this application provides a communications device, including the PTRS sending apparatus provided in the third aspect and the possible designs of the third aspect or in the fourth aspect and the possible designs of the fourth aspect, and a transceiver.

The transceiver is configured to send a PTRS.

According to a sixth aspect, this application provides a readable storage medium, wherein the readable storage medium is configured to store a computer program, and the computer program is used to implement the PTRS sending method provided in the first aspect and the possible designs of the first aspect.

According to a seventh aspect, this application provides a program product, where the program product includes a computer program, the computer program is stored in a readable storage medium, at least one processor of a PTRS sending apparatus may read the computer program from the readable storage medium, and the at least one processor executes the computer program so that the PTRS sending apparatus implements the PTRS sending method in the first aspect and the possible designs of the first aspect.

DESCRIPTION OF EMBODIMENTS

Embodiments of this application may be applied to a wireless communications system. It should be noted that the wireless communications system mentioned in the embodiments of this application includes but is not limited to a Long Term Evolution (LTE) system and three main application scenarios of a next-generation 5G mobile communications system: Enhanced Mobile Broadband (eMBB), ultra-reliable and low latency communications (URLLC), and massive machine-type communications (mMTC). Alternatively, the wireless communications system may be a device-to-device (D2D) communications system, another communications system, a future communications system, or the like.

A communications apparatus in this application may be configured in a communications device, and the communications device mainly includes a network device or a terminal device. If a transmit end in this application is a network device, a receive end is a terminal device; or if a transmit end in this application is a terminal device, a receive end is a network device.

Figure 1A:
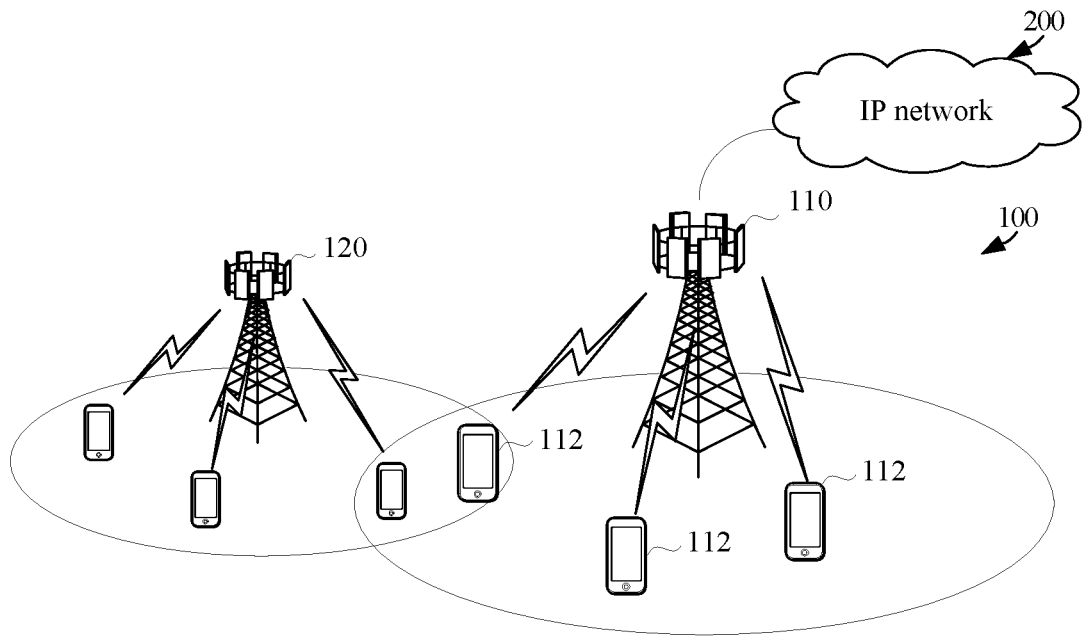
FIG. 1(a) and FIG. 1(b) are schematic architectural diagrams of a communications system applied in an embodiment of this application.

In an embodiment of this application, as shown in FIG. 1(a), a communications system 100 includes a network device 110 and a terminal device 112. When the communications system 100 includes a core network, the network device 110 may be further connected to the core network. The network device 110 may further communicate with an IP network 200, such as the Internet, a private IP network, or another data network. A network device serves a terminal device within a coverage area of the network device. For example, referring to FIG. 1(a), the network device 110 provides wireless access for one or more terminal devices within a coverage area of the network device 110. In addition, there may be an overlapping area between coverage areas of network devices, such as the network device 110 and a network device 120. The network devices may further communicate with each other. For example, the network device 110 may communicate with the network device 120.

Figure 1B:
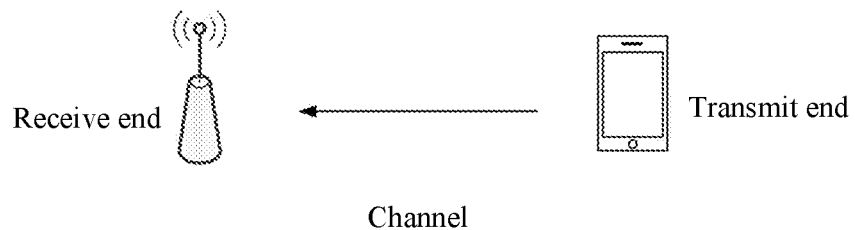

When sending information or data, both the network device 110 and the terminal device 112 can use a PTRS sending method described in an embodiment of this application. For ease of description, in this embodiment of this application, the communications system 100 is simplified as a system including a transmit end 102 and a receive end 101 in FIG. 1(b). The transmit end 102 is the terminal device 112, and the receive end 101 may be the network device 110; or the transmit end 102 is the network device 110, and the receive end 101 is the terminal device 112. The network device 110 may be a device configured to communicate with a terminal device. For example, the network device 110 may be an evolved NodeB (eNB or eNodeB) in an LTE system, a network-side device (gNodeB, gNB) in a 5G network, a network-side device in another network that communicates with a terminal device, or a network-side device in a future network. Alternatively, the network device may be a relay station, an access point, an in-vehicle device, or the like. In the device-to-device (D2D) communications system, the network device may also be a terminal device that takes on the role of a base station. The terminal device may include various handheld devices, in-vehicle devices, wearable devices, computing devices, or other processing devices connected to wireless modems; user equipments (UE) and mobile stations (MS) that are in various forms; and the like, where the foregoing devices have a wireless communication function.

Usually, in downlink control information (DCI) sent by a network device, the network device explicitly indicates a time-frequency resource, an antenna port, a precoding scheme, and the like that are used in uplink transmission in which a terminal device sends data and control information to the network device.

In a conventional system, because a terminal device uses only one local oscillator and has a relatively small quantity of antennas, all DMRS antenna ports are coherent ports, and only one PTRS is required. Therefore, no PTRS needs to be distinguished in DCI, and no dedicated field is required to grant a PTRS.

However, with development of communications technologies, a same network device or terminal device may use an increasing quantity of antennas. Even if one local oscillator is used, it cannot be ensured that all antenna ports connected to the local oscillator are definitely coherent. Alternatively, a same terminal device uses a plurality of ("plurality" herein means "two or more", the same below) local oscillators. In all these cases, more than one PTRS is required, each PTRS port corresponds to one group of DMRS antenna ports, and DMRS antenna ports corresponding to any two different PTRS ports are completely different.

An association relationship further needs to be established between a PTRS antenna port and a specific DMRS antenna port in the group of the DMRS antenna ports. The PTRS antenna port and the DMRS antenna port in the association relationship have same phase noise, and it may be further considered that the PTRS antenna port and the DMRS antenna port experience a same channel in a transmission process. When estimating phase noise, a receive end may determine, by using the association relationship, an estimated channel of which DMRS antenna port needs to be used to assist in phase noise estimation.

Figure 2:
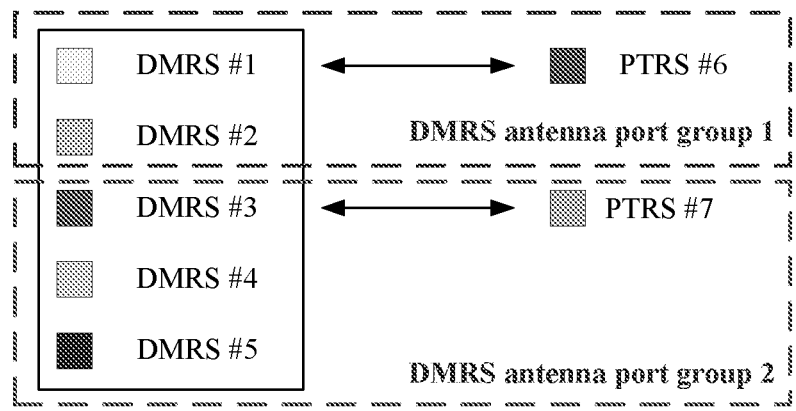
FIG. 2 is a schematic diagram of association between a PTRS antenna port and a DMRS antenna port.

As shown in FIG. 2, DMRS antenna ports 1 and 2 are a group of antenna ports that have same (or very close, without loss of generality, described as "same") phase noise, and DMRS antenna ports 3, 4, and 5 are a group of antenna ports that have same phase noise. These two groups of DMRS antenna ports correspond to PTRS ports 6 and 7, respectively. To be specific, it means that the PTRS port 6 and the DMRS antenna port group {1, 2} have same phase noise, and the PTRS port 7 and the DMRS antenna port group {3, 4, 5} have same phase noise. In the DMRS antenna port group {1, 2}, the PTRS port 6 and the DMRS antenna port 1 in the group have an association relationship and have a same channel (or have same precoding). In the DMRS antenna port group {3, 4, 5}, the PTRS port 7 and the DMRS antenna port 3 have an association relationship and experience a same channel. It may be considered that the antenna ports 1 and 2 belong to one coherent antenna port set, and the antenna ports 3, 4, and 5 belong to another coherent antenna port set. Herein, antenna port group numbers and the PTRS ports are in a one-to-one correspondence. A PTRS group 1 corresponds to the PTRS #6, and a PTRS group 2 corresponds to the PTRS #7. On the premise of not affecting clarity, the PTRS #6 may also be replaced with a PTRS #1, and the PTRS #7 may also be replaced with a PTRS #2.

The coherent antenna port set is a set including antenna ports that can perform coherent transmission. All antenna ports belonging to a same antenna port set may perform coherent transmission. The coherent transmission means that any joint precoding may be performed between antenna ports, to send a sounding reference signal (SRS), a physical uplink shared channel (PUSCH), or a physical uplink control channel (PUCCH). The any joint precoding means that in a precoding vector or matrix, a precoding coefficient corresponding to a group of antenna ports for coherent transmission may be any element.

The coherent antenna port set is a corresponding coherent antenna port set in an SRS resource or resource set configured by a network by using configuration information, or may be a coherent antenna port set reported by a terminal device to a network device by using higher layer signaling, or may be a coherent antenna port set configured by a network device for a terminal by using higher layer signaling. Optionally, one type of higher layer signaling may be codebook subset restriction (CBSR) signaling. The coherent antenna port set is determined by using precoding codeword information indicated in a CBSR. The higher layer signaling may be a radio resource control (RRC) message, a Media Access Control control element (MAC CE) message, a combination thereof, or other control signaling. This is not limited in this application.

Optionally, the SRS resource configuration information sent by the network device to the terminal device may include SRS port coherence information. The port coherence information may be configured by using a plurality of methods. One configuration manner is indicating information about coherence between a plurality of antenna ports in one SRS resource. In another configuration manner, a plurality of SRS resources are configured, each SRS resource includes one or more antenna ports, the plurality of SRS resources are divided or grouped, and SRS antenna ports in a same group of SRS resources are coherent transmission antenna ports. Certainly, there may be another configuration manner. This is not limited in this application.

Particularly, if all antenna ports of a communications device are coherent, the communications device may be considered fully coherent, and there is only one PTRS. If all antenna port pairs of a communications device are mutually incoherent, the communications device may be considered incoherent, and a quantity of PTRSs is equal to a quantity of DMRS antenna ports. If some of antenna port pairs of a communications device may be coherent, the communications device may be considered partially coherent. FIG. 2 shows an example of partial coherence.

Then, when a network device supports a plurality of PTRSs, in downlink transmission, how does the network device notify a terminal device whether one or more PTRSs are used in downlink, which PTRS is used, and which DMRS antenna port is associated with each PTRS port? The network device may notify, on a broadcast channel or in an access process of the terminal device, the terminal device of information about PTRSs supported by the network device. The information includes but is not limited to a quantity of supported PTRSs, a DMRS antenna port group corresponding to each PTRS, and a number of a DMRS antenna port associated with each PTRS port.

When a terminal device supports a plurality of PTRSs, in uplink transmission, how does a network device notify the terminal device whether one or more PTRSs are used in the uplink transmission, which PTRS is used, and which DMRS antenna port is associated with each PTRS port? Certainly, the terminal device may notify a base station of a PTRS support capability when accessing the network device. The PTRS support capability includes but is not limited to a quantity of supported PTRSs, a DMRS antenna port group corresponding to each PTRS, and a number of a DMRS antenna port associated with each PTRS port.

To resolve the foregoing two problems, a simple solution may be used: A field is added to existing DCI, to specially indicate a quantity of PTRSs used in downlink and/or a PTRS port number, or a quantity of PTRSs used by the terminal device in the uplink transmission and/or a PTRS port number; or quasi-static granting is performed by using higher layer signaling. However, this method inevitably causes an increase in overheads. For example, when a device supports two PTRSs, two bits are required. In this manner, although PTRS-related information can be transferred to a receive end very clearly, overheads are undoubtedly large.

Therefore, to effectively control overheads, an implicit manner may be used for indication. In this indication manner, information, such as precoding information and rank information, included in uplink grant information is fully utilized. In this way, a terminal implicitly obtains a quantity of to-be-sent PTRSs and antenna ports for carrying the PTRSs, based only on a preset rule and control information, such as precoding and/or a rank, in the uplink grant information, and no explicit indication signaling is required. This effectively reduces control signaling overheads and improves air interface transmission efficiency. Detailed descriptions are provided below.

Figure 3:
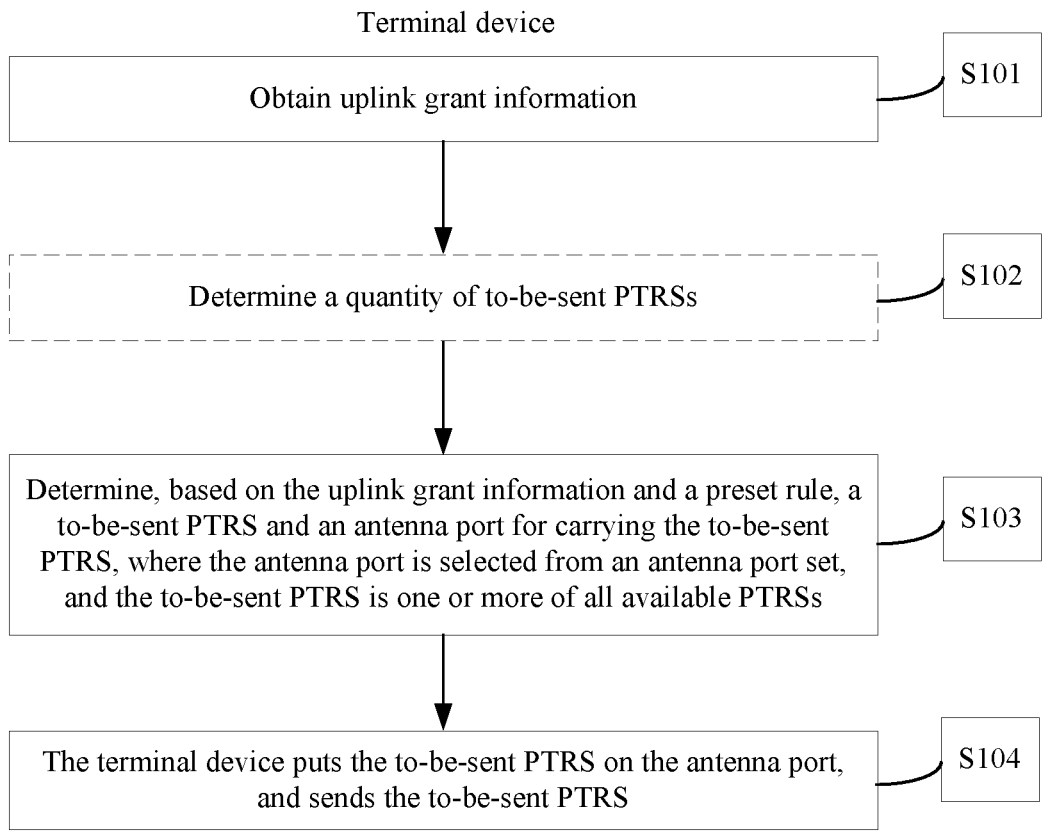
FIG. 3 is a flowchart of an embodiment of a PTRS sending method according to this application.

Using uplink transmission of a terminal device as an example, FIG. 3 is a flowchart of an embodiment of a PTRS sending method according to this application. As shown in FIG. 3, this embodiment is executed by a terminal device (a PTRS transmit end). The method in this embodiment may include the following steps.

S101. Obtain uplink grant information.

The terminal device obtains the uplink grant information sent by a network device. The uplink grant information is usually delivered by the network device, and may be included in DCI, or may be included in another type of control message that can carry the uplink grant information.

The network device determines, based on factors such as a PTRS supported by the terminal device, channel information, and system load, the uplink grant information corresponding to the terminal device.

S102. Determine a quantity of to-be-sent PTRSs.

The quantity of uplink to-be-sent PTRSs is determined based on a quantity of coherent antenna port sets in transmission precoding corresponding to precoding codeword information and/or rank information in the uplink grant information.

In an example, the precoding codeword information herein may be a transmission precoding matrix indicator (TPMI) in LTE or information used to indicate a precoding codeword in 5G or a future communications technology. This is not limited herein.

In an example, the rank information herein may be a transmission rank indicator (TRI) in LTE or information used to indicate a rank in 5G or a future communications technology. This is not limited herein.

S103. Determine, based on the uplink grant information and a preset rule, a to-be-sent PTRS and an antenna port for carrying the to-be-sent PTRS, where the antenna port is selected from an antenna port set, and the to-be-sent PTRS is one or more of all available PTRSs.

Optionally, step S102 and step S103 may be combined. In other words, when the antenna port for carrying the to-be-sent PTRS is determined, a quantity of antenna ports is the quantity of to-be-sent PTRSs. Therefore, in descriptions of this application, S102 and S103 are not clearly distinguished.

For example, based on a correspondence between a PTRS port and an antenna port in the coherent antenna port set and information, about an antenna port that can perform coherent transmission, of a transmission precoding matrix corresponding to the TPMI in the uplink grant information, the terminal device determines that a PTRS port corresponds to at least one port in an uplink DMRS port (or an uplink DMRS port set). The coherent antenna port set is a set including antenna ports that can perform coherent transmission. All antenna ports belonging to a same antenna port set may perform coherent transmission. The coherent transmission means that any joint precoding may be performed between antenna ports, to send a sounding reference signal (SRS), a physical uplink shared channel (PUSCH), or a physical uplink control channel (PUCCH). The any joint precoding means that in a precoding vector or matrix, a precoding coefficient corresponding to a group of antenna ports for coherent transmission may be any element. The coherent antenna port set is a corresponding coherent antenna port set in an SRS configured for the terminal device, or may be a coherent antenna port set reported by the terminal device to the network device by using higher layer signaling.

When the uplink grant information includes the precoding codeword information, the information about the antenna port that can perform coherent transmission may be determined based on a precoding codeword corresponding to the precoding codeword information, and it may be determined, based on the correspondence of the antenna port in the coherent antenna port set, that the PTRS port corresponds to at least one uplink DMRS port. The precoding codeword information may be a transmission precoding codeword index, a precoding codeword jointly coded with a rank or an index of a precoding codeword jointly coded with a rank, or precoding information in any other form.

Figure 4:
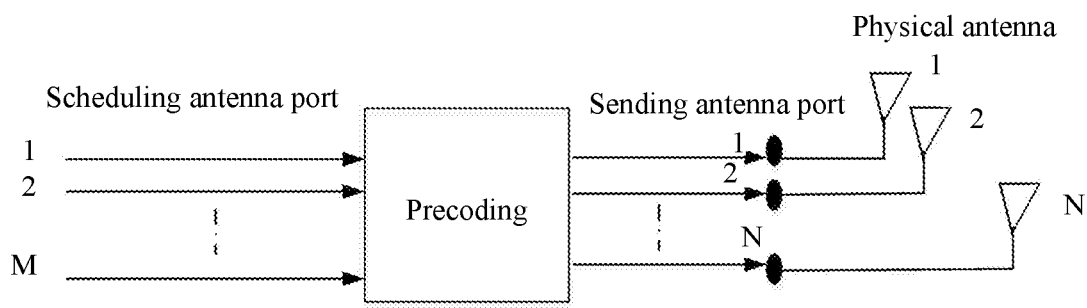
FIG. 4 is a schematic diagram of a scheduling antenna port and a sending antenna port according to this application.

As shown in FIG. 4, when an antenna port is mentioned, there may be actually two different meanings. One is an antenna port before precoding, which may as well be referred to as a scheduling antenna port. In this case, a quantity of DMRS antenna ports is M, in other words, an antenna port set includes M scheduling antenna ports. The other is an antenna port after precoding, which may as well be referred to as a sending antenna port. In this case, a quantity of DMRS antenna ports is N, in other words, an antenna port set includes N sending antenna ports. However, it should be noted that both the scheduling antenna port and the sending antenna port actually have same impact on final air interface transmission, and are merely different representations in a signal processing procedure. If X represents a vector before precoding, P represents a precoding codeword, Y represents a precoding output vector, and Y=PX, a dimension of the precoding codeword P is N×M. It should be noted that in actual application, a quantity of physical antennas in FIG. 4 is not necessarily N, but may be greater than N as required.

As an application scenario varies, a scheduling antenna port for carrying a PTRS may be determined, or a sending antenna port for carrying a PTRS may be determined.

Specifically, a preset rule 1 may be specified as follows: Each column of the precoding codeword corresponding to the precoding codeword information and the M scheduling antenna ports in the antenna port set are in a one-to-one correspondence, and if there is more than one non-zero element in a same row of the precoding codeword, scheduling antenna ports corresponding to columns in which the more than one non-zero element is located are coherent antenna ports, to be specific, correspond to a same PTRS. In other words, the columns of the precoding codeword that correspond to the coherent antenna ports in the antenna port set are in a same group, the columns in which the non-zero elements in the same row of the precoding codeword are located belong to a same group, and the group and the to-be-sent PTRS are in a one-to-one correspondence. Optionally, the group may be further numbered, and a group number and a PTRS port number are in a one-to-one correspondence.

Similarly, a preset rule 2 may be specified as follows: Each row of the precoding codeword corresponding to the precoding codeword information and the N sending antenna ports in the antenna port set are in a one-to-one correspondence, and if there is more than one non-zero element in a same row of the precoding codeword, sending antenna ports corresponding to rows in which all non-zero elements in columns of the more than one non-zero element are located are coherent antenna ports, to be specific, correspond to a same PTRS. In other words, the rows of the precoding codeword that correspond to the coherent antenna ports in the antenna port set are in a same group, rows in which non-zero elements in a same column of the precoding codeword are located belong to a same group, and the group and the to-be-sent PTRS are in a one-to-one correspondence. Optionally, the group may be further numbered, and a group number and a PTRS port number are in a one-to-one correspondence.

Using a terminal device having four antenna ports as an example, a maximum of four layers of data transmission are supported simultaneously (both M and N are less than or equal to 4). It is assumed that the four antenna ports may be divided into two groups, each group includes two antenna ports, and the two antenna ports can perform coherent transmission. For example, the two antenna ports correspond to a pair of cross polarization antennas, or the two antenna ports correspond to one antenna panel. According to the foregoing rule, PTRS ports finally determined by the terminal device are shown in Table 1. In a transmission precoding vector or matrix, corresponding $\beta_i$ (where i=0, 1, 2, ..., 6) is a power normalization coefficient, all letter parameters in $P_i$ (where i=0, 1, 2, ..., 6) are weight coefficients, and are usually complex numbers whose modulus value ranges from 0 to 1 (including 0 and 1). On the premise that a rank requirement is met, some weight coefficients may be 0. Without loss of generality, a row number or a column number is directly used to represent an antenna port number.

Optionally, by using all or a part of Table 1 and a table lookup method, the terminal device may directly search for, based on the precoding codeword, the antenna port for carrying the PTRS. Certainly, Table 1 is merely an example.

TABLE 1

| Rank | Precoding codeword (matrix or vector) | Preset rule 1: A scheduling antenna port carries a PTRS | | | Preset rule 2: A sending antenna port carries a PTRS | | |
|---|---|---|---|---|---|---|---|
| | | Quantity of groups of scheduling antenna ports (quantity of PTRSs) M | Number of a scheduling antenna port for carrying a PTRS | | Quantity of groups of sending antenna ports (quantity of PTRSs) N | Number of a sending antenna port for carrying a PTRS |
| 1 | $P_0 = \dfrac{1}{\beta_0} \begin{bmatrix} a_{11} \\ a_{21} \\ 0 \\ 0 \end{bmatrix}$ | 1 | 1 | #1 | 2 | 1 | #1 or #2 |

TABLE 1-continued

| Rank | Precoding codeword (matrix or vector) | Preset rule 1: A scheduling antenna port carries a PTRS | | | Preset rule 2: A sending antenna port carries a PTRS | |
|---|---|---|---|---|---|---|
| | | Quantity of groups of scheduling antenna ports (quantity of PTRSs) M | Number of a scheduling antenna port for carrying a PTRS | | Quantity of groups of sending antenna ports (quantity of PTRSs) N | Number of a sending antenna port for carrying a PTRS |
| 1 | $P_1 = \frac{1}{\beta_1}\begin{bmatrix} 0 \\ 0 \\ a_{31} \\ a_{41} \end{bmatrix}$ | 1 | 1 | #1 | 2 | 1 | #3 or #4 |
| 2 | $P_2 = \frac{1}{\beta_2}\begin{bmatrix} b_{11} & 0 \\ b_{21} & 0 \\ 0 & b_{32} \\ 0 & b_{42} \end{bmatrix}$ | 2 | 2 | #1 (carrying a PTRS #1) #2 (carrying a PTRS #2) | 4 | 2 | #1 or #2 (carrying a PTRS #1) #3 or #4 (carrying a PTRS #2)* |
| 2 | $P_3 = \frac{1}{\beta_3}\begin{bmatrix} c_{11} & c_{12} \\ c_{21} & c_{22} \\ 0 & 0 \\ 0 & 0 \end{bmatrix}$ | 2 | 1 | #1 or #2 | 2 | 1 | #1 or #2 |
| 3 | $P_4 = \frac{1}{\beta_4}\begin{bmatrix} d_{11} & d_{12} & 0 \\ d_{21} & d_{22} & 0 \\ 0 & 0 & d_{33} \\ 0 & 0 & d_{43} \end{bmatrix}$ | 3 | 2 | #1 or #2 (carrying the PTRS #1) #3 (carrying the PTRS #2) | 4 | 2 | #1 or #2 (carrying the PTRS #1) #3 or #4 (carrying the PTRS #2) |
| 3 | $P_5 = \frac{1}{\beta_5}\begin{bmatrix} e_{11} & 0 & e_{13} \\ 0 & e_{22} & 0 \\ e_{31} & 0 & e_{33} \\ 0 & e_{42} & 0 \end{bmatrix}$ | 3 | 2 | #1 or #3 (carrying the PTRS #1) #2 (carrying the PTRS #2) | 4 | 2 | #1 or #3 (carrying the PTRS #1) #2 or #4 (carrying the PTRS #2) |
| 4 | $P_6 = \frac{1}{\beta_6}\begin{bmatrix} f_{11} & 0 & f_{13} & 0 \\ 0 & f_{22} & 0 & f_{24} \\ f_{31} & 0 & f_{33} & 0 \\ 0 & f_{42} & 0 & f_{44} \end{bmatrix}$ | 4 | 2 | #1 or #3 (carrying the PTRS #1) #2 or #4 (carrying the PTRS #2) | 4 | 2 | #1 or #3 (carrying the PTRS #1) #2 or #4 (carrying the PTRS #2) |

Herein, *means that #1 or #2 may be alternatively used to carry the PTRS #2, and #3 or #4 may be alternatively used to carry the PTRS #1, provided that there is a pre-agreement.

This does not affect the essence of the method in this application. A mapping manner for the other two PTRSs and antenna ports is similar. Table 1 is merely an example.

Based on Table 1, there may be the following deductions, including but not limited to:

(1) For a same precoding codeword, a same quantity of PTRSs is obtained according to different preset rules.

(2) Even for a same rank, according to a same preset rule, quantities of PTRSs that correspond to different precoding codewords may be the same or may be different. For example, for $P_2$ and $P_3$, according to the preset rule 1, a quantity of PTRSs that corresponds to $P_2$ is 1, and a quantity of PTRSs that corresponds to $P_3$ is 2; according to the preset rule 2, a quantity of PTRSs that corresponds to $P_2$ is 2, and a quantity of PTRSs that corresponds to $P_3$ is 4.

(3) Even for a same quantity of PTRSs, according to different preset rules, selected antenna ports for carrying PTRSs may be the same or may be different. For example, for $P_0$ and $P_1$, according to the preset rule 1, only the antenna port #1 can be selected; however, according to the preset rule 2, an antenna port corresponding to $P_0$ and $P_1$ is not limited to the antenna port #1, and particularly, the antenna port #1 cannot be selected to carry a PTRS corresponding to $P_1$.

(4) For a given antenna group, if a plurality of PTRSs need to be supported, only some precoding codewords may be selected. For example, for $P_4$ and $P_5$, because a PTRS corresponds to an antenna port in different manners, an antenna port needs to be determined based on an antenna group feature of a terminal.

It should be noted that "or" in Table 1 indicates that related antenna ports are coherent antenna ports and belong to a same coherent antenna port set. Which antenna port in a coherent antenna port set corresponding to a same PTRS is used to carry the PTRS is not limited in this application. Optionally, a correspondence between one PTRS port and antenna ports in all coherent antenna ports corresponding to the PTRS port includes but is not limited to that a number of the PTRS port corresponds to a largest antenna port number, a smallest antenna port number, an odd number, an even number, or any antenna port number defined according to a predefined rule in a coherent antenna port set. The correspondence is predefined, or is configured by using higher layer signaling, DCI, or any pre-agreed downlink channel.

For example, X bits may be added to the DCI to indicate a number of an antenna port for carrying a PTRS. Then, depending on a specific quantity of PTRSs, the X bits need to be interpreted and mapped by using different preset rules. Usually, if a quantity of antenna ports is Z, $X=\log_2 Z$ or $X=Z/2$ may be taken. For example, X may be 2 in the example in Table 1. When a terminal device supports only one PTRS, the two bits indicate which one of four antenna ports is used to send the PTRS. When a terminal device can support a maximum of two PTRSs, the two bits may respectively indicate antenna ports corresponding to the PTRSs. For example, if the precoding codeword is $P_4$, the first bit is used to indicate whether the PTRS #1 is carried by the antenna port #1 or the antenna port #2. For example, when the first bit is 0, it indicates that the PTRS #1 is carried by the antenna port #1, or when the first bit is 1, it indicates that the PTRS #1 is carried by the antenna port #2; and vice versa. When the preset rule 1 is used, the second bit is redundant. However, when the preset rule 2 is used, the second bit may be used to indicate whether the PTRS #2 is carried by the antenna port #3 or the antenna port #4. If the precoding codeword is $P_6$, whether the preset rule 1 or the preset rule 2 is used, the first bit may be used to indicate whether the PTRS #1 is carried by the antenna port #1 or the antenna port #3, and the second bit may be used to indicate whether the PTRS #2 is carried by the antenna port #2 or the antenna port #4. According to this method, the quantity of PTRSs is obtained in the foregoing manner, and then different mapping indications are performed on the X bits based on different quantities of PTRSs. Such a method may also be considered as an implicit indication.

Optionally, the X bits may be used to indicate numbers of antenna ports selected for X PTRSs. Each PTRS corresponds to two antenna ports. For a bit corresponding to the PTRS, a value of 0 indicates one of the two antenna ports, and a value of 1 indicates the other one of the two antenna ports.

Optionally, the precoding codeword may be one codeword in a CBSR.

If the preset rule for determining the quantity of to-be-sent PTRSs and the antenna ports for carrying the to-be-sent PTRSs needs to be further simplified, only rank information may be used. In this manner, the terminal device determines the quantity of PTRSs based on a value of a rank, and then determines, based on a one-to-one correspondence between the predetermined quantity of PTRSs and the antenna ports for carrying the PTRSs, DMRS antenna ports for sending the to-be-sent PTRSs.

For example, if the uplink grant information includes the rank information, and the value of the rank is R, the quantity A of to-be-sent PTRSs is min(R, C), min(S, C), min(Q, C), or any pre-agreed value, where C is a maximum quantity of PTRSs supported by the terminal device or a maximum quantity of PTRSs configured by a network device for the terminal device, S is a minimum quantity of PTRSs supported by the terminal device when R is given, Q is a maximum quantity of PTRSs supported by the terminal device when R is given, C, R, S, and Q are positive integers, and min( ) is an operation of finding a minimum value in the brackets. After A is determined, optionally, A PTRSs are successively selected as the to-be-sent PTRSs in ascending order of port numbers of all the available PTRSs, or A PTRSs are successively selected as the to-be-sent PTRSs in descending order of port numbers of all the available PTRSs, or A PTRSs are selected from all the available PTRSs as the to-be-sent PTRSs according to any preset rule. For example, according to Table 1, the manner of successive selection in ascending order of the PTRS port numbers is actually used by default.

It can be learned that this mapping manner is simple, but a relatively large amount of content needs to be pre-agreed between the network device and the terminal device. For example, when R=2, because no precoding codeword information is used and a correspondence between a PTRS port and an antenna port is relatively fixed, an actually available precoding codeword may be only one of $P_2$ and $P_3$. In the example in Table 1, C=2; therefore, when R=2, S=1, and Q=2. When the quantity A of PTRSs is min(R, C)=2 or min(Q, C)=2, only $P_2$ can be used, and an antenna port for carrying a PTRS is determined based on the correspondence in Table 1. When the quantity A of PTRSs is min(S, C)=1, only $P_3$ can be used, and an antenna port for carrying a PTRS is determined based on the correspondence in Table 1.

Certainly, herein, a process of determining the quantity of PTRSs may be directly skipped, and a one-to-one correspondence may be established between the rank information and the antenna ports for carrying the PTRSs. For example, only some rows and columns in Table 1 are selected to form Table 2. It should be noted that Table 2 is merely an example. A selection rule is A=min(Q, C).

TABLE 2

| | | Preset rule 1:<br>A scheduling antenna port carries a PTRS | | Preset rule 2:<br>A sending antenna port carries a PTRS |
|---|---|---|---|---|
| Rank | M | Number of a scheduling antenna port for carrying a PTRS | N | Number of a sending antenna for port carrying a PTRS |
| 1 | 1 | #1 | 2 | #1 or #2 |
| 2 | 2 | #1 (carrying a PTRS #1)<br>#2 (carrying a PTRS #2) | 4 | #1 or #2 (carrying a PTRS #1)<br>#3 or #4 (carrying a PTRS #2) |

TABLE 2-continued

| | | Preset rule 1:<br>A scheduling antenna port carries a PTRS | | Preset rule 2:<br>A sending antenna port carries a PTRS |
|---|---|---|---|---|
| Rank | M | Number of a scheduling antenna port for carrying a PTRS | N | Number of a sending antenna for port carrying a PTRS |
| 3 | 3 | #1 or #2 (carrying the PTRS #1)<br>#3 (carrying the PTRS #2) | 4 | #1 or #2 (carrying the PTRS #1)<br>#3 or #4 (carrying the PTRS #2) |
| 4 | 4 | #1 or #3 (carrying the PTRS #1)<br>#2 or #4 (carrying the PTRS #2) | 4 | #1 or #3 (carrying the PTRS #1)<br>#2 or #4 (carrying the PTRS #2) |

Likewise, if X bits are used to indicate the antenna ports for carrying the PTRSs, the X bits may also be interpreted and mapped by using the foregoing method. Details are not described herein again.

Similarly, the terminal device may further determine information about an uplink PTRS port based on SRS resource information that corresponds to SRI in uplink scheduling grant information. The information about the PTRS port includes information about a quantity of PTRS ports and information about a correspondence between a PTRS port and a DMRS port.

S104. Send the to-be-sent PTRS on the antenna port.

It should be noted that the figure does not show a process of determining a to-be-sent PTRS sequence and a time-frequency resource by the terminal device, and specific processing steps such as resource mapping, modulation, digital-to-analog conversion, and frequency conversion. Because all these belong to the prior art, details are not described.

Figure 5:
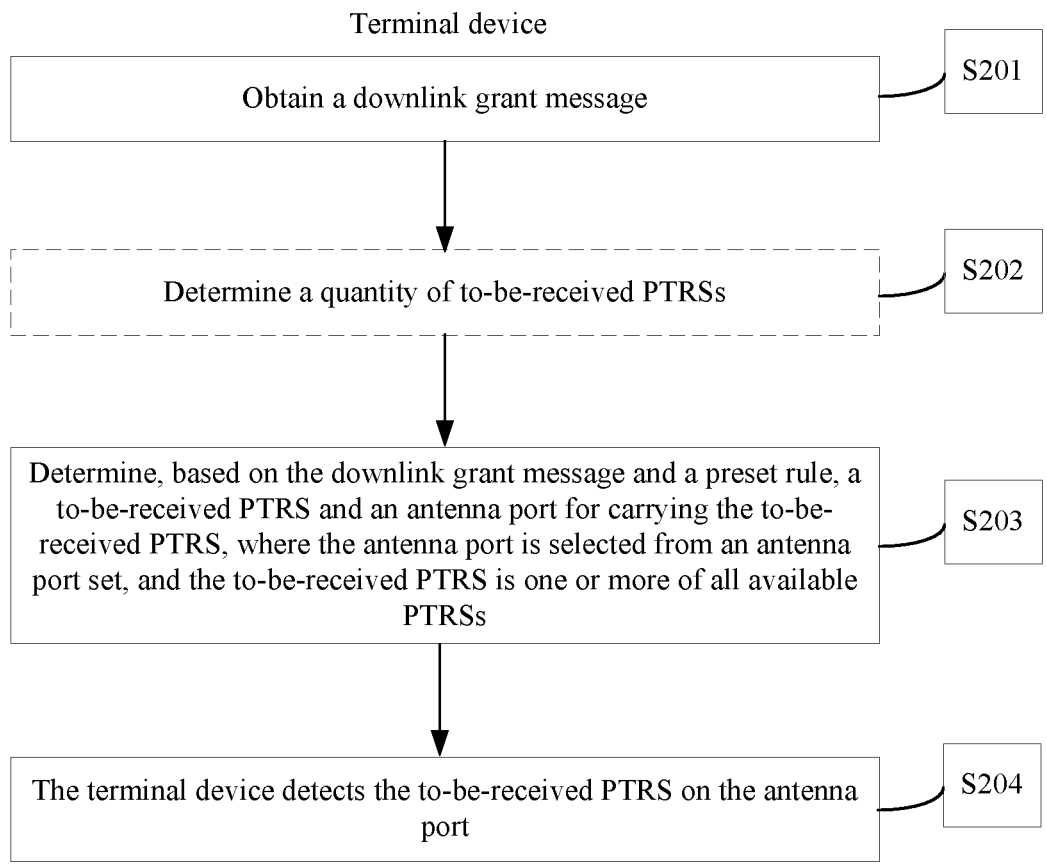
FIG. 5 is a schematic flowchart of a PTRS receiving method according to this application.

The example shown in FIG. 3 is an example for uplink transmission. Actually, these preset rules are also applicable to downlink PTRS reception. To be specific, in downlink transmission of data or control information, a quantity of PTRSs used on a network device side and antenna ports for carrying the PTRSs may also be notified to a terminal device in an implicit manner or a partially implicit manner with X additional bits, based on a downlink transmission precoding codeword or rank information carried in DCI. FIG. 5 is an embodiment of PTRS reception.

S201. A terminal device obtains downlink grant information.

S202. The terminal device determines a quantity of to-be-received PTRSs.

S203. The terminal device determines, based on the downlink grant information and a preset rule, a to-be-received PTRS and an antenna port for carrying the to-be-received PTRS, where the antenna port is selected from an antenna port set, and the to-be-received PTRS is one or more of all available PTRSs.

A method of steps S202 and S203 is consistent with that of steps S102 and S103. Details are not described herein again.

S204. The terminal device detects the to-be-received PTRS on the antenna port.

It should be noted that the foregoing steps are not necessarily performed in sequence, and some steps are optional, such as step S102 and step S202.

It should be further noted that all the foregoing methods relate to a single TPMI. Usually, one TPMI corresponds to at least one PTRS. Therefore, when one piece of DCI or other uplink grant information includes two or more TPMIs, it means that the terminal device supports at least two PTRSs. This capability and a correspondence between a PTRS and an antenna port may be notified to a network device when the terminal device accesses a network. Specifically, the foregoing method may be used to determine a PTRS corresponding to each TPMI.

Figure 6:
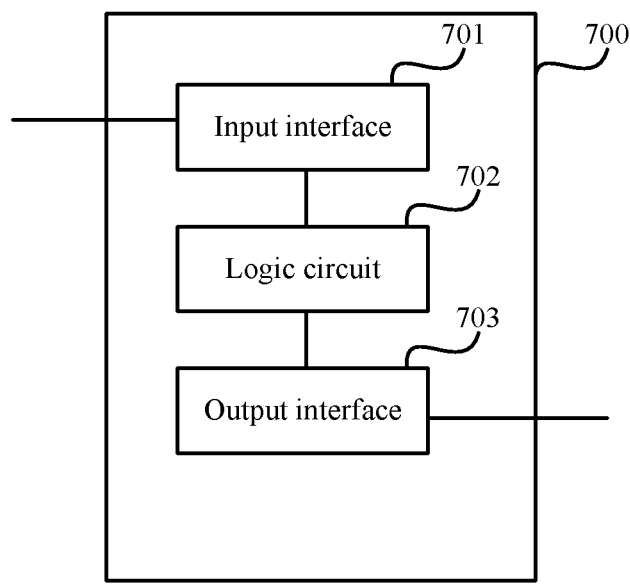
FIG. 6 is a schematic structural diagram 1 of a PTRS sending apparatus according to an embodiment of this application.

Based on a concept as that of the PTRS sending method shown in FIG. 3, as shown in FIG. 6, an embodiment of this application further provides a PTRS sending apparatus 700. The PTRS sending apparatus 700 is configured to perform the PTRS sending method shown in FIG. 3. Some or all of the steps in the PTRS sending method shown in FIG. 3 may be implemented by using hardware or software. When the steps are implemented by using hardware, the PTRS sending apparatus 700 includes: an input interface 701, configured to obtain uplink grant information; a logic circuit 702, configured to perform the PTRS sending method shown in FIG. 3, where for details, reference may be made to the descriptions in the foregoing method embodiment, and details are not described herein again; and an output interface 703, configured to output a PTRS.

Optionally, during specific implementation, the PTRS sending apparatus 700 may be a chip or an integrated circuit.

Figure 7:
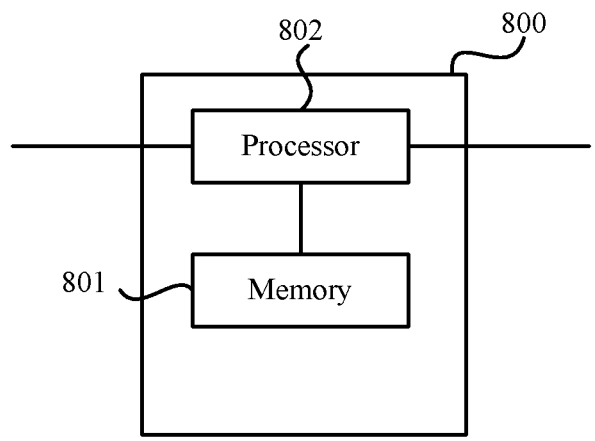
FIG. 7 is a schematic structural diagram 2 of a PTRS sending apparatus according to an embodiment of this application.

Optionally, when some or all of the steps in the PTRS sending method in the foregoing embodiment are implemented by using software, as shown in FIG. 7, a PTRS sending apparatus 800 includes: a memory 801, configured to store a program; and a processor 802, configured to execute the program stored in the memory 801. When the program is executed, the PTRS sending apparatus 800 may implement the PTRS sending method provided in the embodiment corresponding to FIG. 3.

Optionally, the memory 801 may be a physically independent unit, or may be integrated with the processor 802.

Optionally, when some or all of the steps in the PTRS sending method in the embodiment corresponding to FIG. 3 are implemented by using software, the PTRS sending apparatus 800 may include only the processor 802. The memory 801 configured to store the program is located outside the PTRS sending apparatus 800. The processor 802 is connected to the memory 801 by using a circuit or a wire, to read and execute the program stored in the memory 801.

The processor 802 may be a central processing unit (CPU), a network processor (NP), or a combination of a CPU and an NP.

The processor 802 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory 801 may include a volatile memory, such as a random access memory (RAM). Alternatively, the memory 801 may include a non-volatile memory, such as a flash memory, a hard disk drive (HDD), or a solid-state drive (SSD). Alternatively, the memory 801 may include a combination of the foregoing types of memories.

Figure 8:
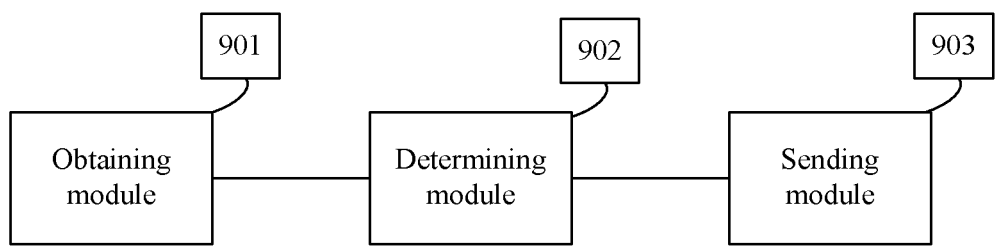
FIG. 8 is a schematic structural diagram 3 of a PTRS sending apparatus according to an embodiment of this application.

Based on a similar concept as that of the PTRS sending method shown in the embodiment corresponding to FIG. 3, as shown in FIG. 8, an embodiment of this application further provides a schematic structural diagram of an embodiment of a PTRS sending apparatus. The PTRS sending apparatus may include an obtaining module 901, a determining module 902, and a sending module 903. The obtaining module 901 is configured to perform the method corresponding to step S101, the determining module 902 is configured to perform the method corresponding to steps S102 and S103, and the sending module 903 is configured to perform the method corresponding to step S104. The apparatus is a terminal device.

The apparatus in this embodiment may be configured to execute the technical solution in the method embodiment corresponding to FIG. 3. An implementation principle and a technical effect of the apparatus are similar to those of the method embodiment. Details are not described herein again.

It should be noted that FIG. 8 does not show some or all of common modules in the prior art, including but not limited to PTRS sequence generation module, a time-frequency resource determining module, a modulation module, a digital-to-analog conversion module, a frequency conversion module, and a sending module. The sending module is configured to send a PTRS. Before the PTRS is sent, operations such as modulation and digital-to-analog conversion need to be further performed.

Figure 9:
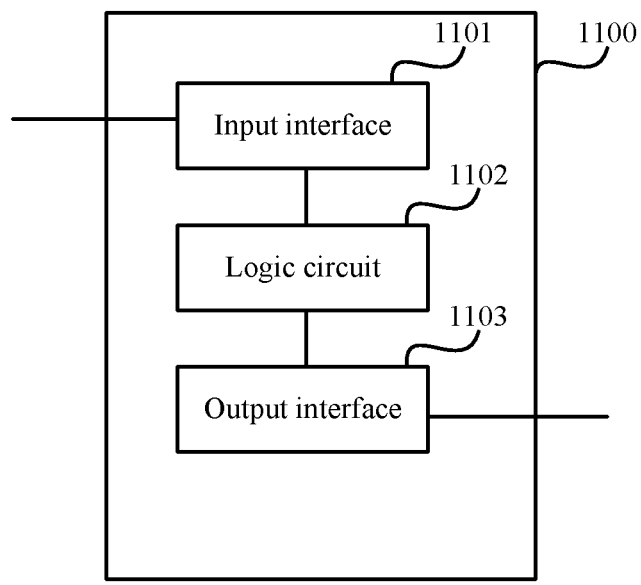
FIG. 9 is a schematic structural diagram 1 of a PTRS receiving apparatus according to an embodiment of this application.

Based on a similar concept as that of the PTRS sending method shown in FIG. 5, as shown in FIG. 9, an embodiment of this application further provides a PTRS receiving apparatus 1100. The PTRS receiving apparatus 1100 is configured to perform the PTRS receiving method shown in FIG. 5. Some or all of the steps in the PTRS receiving method shown in FIG. 5 may be implemented by using hardware or software. When the steps are implemented by using hardware, the PTRS receiving apparatus 1100 includes: an input interface 1101, configured to obtain downlink grant information; a logic circuit 1102, configured to perform the PTRS receiving method shown in FIG. 5, where for details, reference may be made to the descriptions in the foregoing method embodiment, and details are not described herein again; and an output interface 1103, configured to output a PTRS obtained after detection.

Optionally, during specific implementation, the PTRS receiving apparatus 1100 may be a chip or an integrated circuit.

Figure 10:
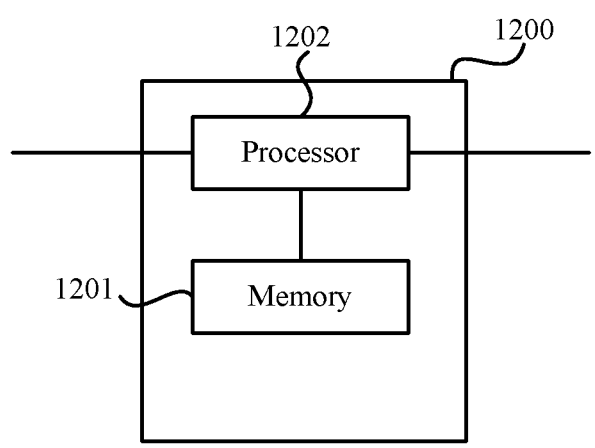
FIG. 10 is a schematic structural diagram 2 of a PTRS receiving apparatus according to an embodiment of this application.

Optionally, when some or all of the steps in the PTRS receiving method in the foregoing embodiment are implemented by using software, as shown in FIG. 10, a PTRS receiving apparatus 1200 includes: a memory 1201, configured to store a program; and a processor 1202, configured to execute the program stored in the memory 1201. When the program is executed, the PTRS receiving apparatus 1200 may implement the PTRS receiving method provided in the embodiment corresponding to FIG. 5.

Optionally, the memory 1201 may be a physically independent unit, or may be integrated with the processor 1202.

Optionally, when some or all of the steps in the PTRS receiving method in the embodiment corresponding to FIG. 5 are implemented by using software, the PTRS receiving apparatus 1200 may include only the processor 1202. The memory 1201 configured to store the program is located outside the PTRS receiving apparatus 1200. The processor 1202 is connected to the memory 1201 by using a circuit or a wire, to read and execute the program stored in the memory 1201.

The processor 1202 may be a central processing unit (CPU), a network processor (NP), or a combination of a CPU and an NP.

The processor 1202 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory 1201 may include a volatile memory, such as a random access memory (RAM). Alternatively, the memory 1201 may include a non-volatile memory, such as a flash memory, a hard disk drive (HDD), or a solid-state drive (SSD). Alternatively, the memory 1201 may include a combination of the foregoing types of memories.

Figure 11:
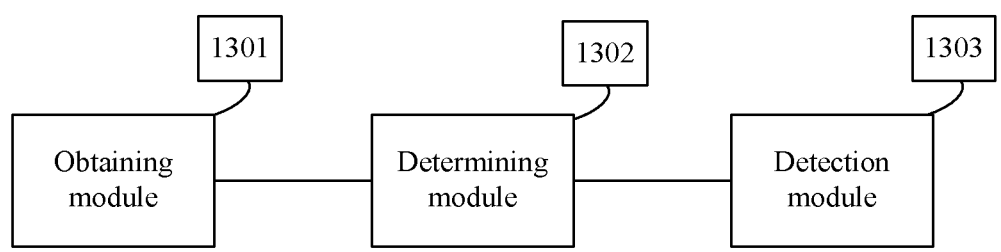
FIG. 11 is a schematic structural diagram 3 of a PTRS receiving apparatus according to an embodiment of this application.

Based on a similar concept as that of the PTRS receiving method shown in the embodiment corresponding to FIG. 5, as shown in FIG. 11, an embodiment of this application further provides a schematic structural diagram of an embodiment of a PTRS receiving apparatus. The PTRS receiving apparatus may include an obtaining module 1301, a determining module 1302, and a detection module 1303. The obtaining module 1301 is configured to perform the method corresponding to step S201, the determining module 1302 is configured to perform the method corresponding to steps S202 and S203, and the detection module 1303 is configured to perform the method corresponding to step S204. The apparatus is a terminal device.

The apparatus in this embodiment may be configured to execute the technical solution in the method embodiment corresponding to FIG. 5. An implementation principle and a technical effect of the apparatus are similar to those of the method embodiment. Details are not described herein again.

It should be noted that FIG. 11 does not show some or all of common modules in the prior art, including but not limited to a PTRS sequence determining module, a time-frequency resource determining module, a demodulation module, an analog-to-digital conversion module, and a frequency conversion module. The detection module is configured to detect a PTRS. Before detection, operations such as demodulation, analog-to-digital conversion, PTRS sequence mapping, and time-frequency resource mapping need to be further performed.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, and an optical memory) that include computer-usable program code. The computer instructions may further be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of this application have been described, a person skilled in the art can make changes and modifications to these embodiments once they learn the basic inventive concept. Therefore, the following claims are intended to be construed as to cover the embodiments and all changes and modifications falling within the scope of this application.

Obviously, a person skilled in the art can make various modifications and variations to the embodiments of this application without departing from the spirit and scope of the embodiments of this application. This application is intended to cover these modifications and variations provided that they fall within the scope of the claims of this application and their equivalent technologies.

What is claimed is:

1. A phase tracking reference signal (PTRS) sending method, comprising:
   obtaining, by a terminal device, uplink grant information that comprises at least one transmission precoding matrix indicator (TPMI);
   determining, by the terminal device based on uplink grant information and a preset rule, an antenna port associated with a to-be-sent PTRS for each of the at least one TPMI, wherein the antenna port associated with the to-be-sent PTRS is selected from an antenna port set and the to-be-sent PTRS is one or more of all available PTRSs, the preset rule comprises each column of a precoding codeword corresponding to one of the at least one TPMI and each antenna port in the antenna port set corresponding to the one of the at least one TPMI are in a one-to-one correspondence, and antenna ports in the antenna port set that correspond to columns in which non-zero elements in a same row of the precoding codeword are located correspond to a same to-be-sent PTRS; and
   sending, by the terminal device, the at least one to-be-sent PTRS on the at least one antenna port corresponding to the at least one TPMI.

2. The method according to claim 1, wherein the antenna port set is a scheduling antenna port set.

3. The method according to claim 1, wherein before the terminal device obtains the uplink grant information, the terminal device sends, to the network device, capability information of supporting at least two PTRSs.

4. The method according to claim 1, wherein the uplink grant information further comprises X bits, and the X bits are used to indicate numbers of antenna ports associated with X to-be-sent PTRSs.

5. The method according to claim 4, wherein any bit in the X bits is used to indicate a number of an antenna port of one to-be-sent PTRS; the one to-be-sent PTRS corresponds to two antenna ports; and for the any bit, a value of 0 indicates one of the two antenna ports, and a value of 1 indicates the other one of the two antenna ports.

6. The method according to claim 4, wherein X is equal to 2.

7. The method according to claim 1, wherein the sending, by the terminal device, the at least one to-be-sent PTRS is: putting, by the terminal device, the at least one to-be-sent PTRS on the at least one antenna port associated with the to-be-sent PTRS corresponding to the at least one TPMI.

8. The method according to claim 1, wherein the antenna port set comprises at least four antenna ports.

9. A phase tracking reference signal (PTRS) sending apparatus, comprising:
   a memory, configured to store instructions; and
   a processor configured to execute the instructions stored in the memory to:
      obtain uplink grant information, wherein the uplink grant information comprises at least one transmission precoding matrix indicator (TPMI); and
      determine, based on the uplink grant information and a preset rule, an antenna port associated with a to-be-sent PTRS for each of the at least one TPMI, wherein the antenna port associated with the to-be-sent PTRS is selected from an antenna port set, and the to-be-sent PTRS is one or more of all available PTRSs, wherein the preset rule comprises: each column of a precoding codeword corresponding to one of the at least one TPMI and each antenna port in the antenna port set corresponding to the one of the at least one TPMI are in a one-to-one correspondence, and antenna ports in the antenna port set that correspond to columns in which non-zero elements in a same row of the precoding codeword are located correspond to a same to-be-sent PTRS.

10. The apparatus according to claim 9 wherein the antenna port set is a scheduling antenna port set.

11. The apparatus according to claim 9, wherein before obtaining the uplink grant information, the processor is further configured to send, to the network device, capability information of supporting at least two PTRSs.

12. The apparatus according to claim 9, wherein the uplink grant information comprises X bits, and the X bits are used to indicate a number of the antenna port associated with the to-be-sent PTRS.

13. The apparatus according to claim 12 wherein any bit in the X bits is used to indicate a number of an antenna port of one to-be-sent PTRS; the one to-be-sent PTRS corresponds to two antenna ports; and for the any bit, a value of 0 indicates one of the two antenna ports, and a value of 1 indicates the other one of the two antenna ports.

14. The apparatus according to claim 12, wherein X is equal to 2.

15. The apparatus according to claim 9, wherein the processor is further configured to put the at least one to-be-sent PTRS on the at least one antenna port associated with the to-be-sent PTRS corresponding to the at least one TPMI.

16. The apparatus according to claim 9, wherein the antenna port set comprises at least four antenna ports.

17. A phase tracking reference signal (PTRS) transmission method, comprising:
  sending, by a network device, uplink grant information, wherein the uplink grant information comprises precoding codeword information;
  receiving, by the network device, a PTRS on an antenna port, wherein the antenna port is determined based on the uplink grant information and a preset rule, the antenna port associated with the PTRS is selected from an antenna port set and the PTRS is one or more of all available PTRSs; and the preset rule comprises: each column of a precoding codeword corresponding to the precoding codeword information and each antenna port in the antenna port set are in a one-to-one correspondence, and antenna ports in the antenna port set that correspond to columns in which non-zero elements in a same row of the precoding codeword are located correspond to a same PTRS.

18. The method according to claim 17, wherein the antenna port set is a scheduling antenna port set.

19. The method according to claim 17, wherein the uplink grant information comprises X bits, and the X bits are used to indicate numbers of antenna ports associated with X to-be-sent PTRSs.

20. The method according to claim 19, wherein any bit in the X bits is used to indicate a number of an antenna port of one to-be-sent PTRS; the one to-be-sent PTRS corresponds to two antenna ports; and for the any bit, a value of 0 indicates one of the two antenna ports, and a value of 1 indicates the other one of the two antenna ports.

21. The method according to claim 19, wherein X is equal to 2.

22. The method according to claim 17, wherein the antenna port set comprises at least four antenna ports.

23. A phase tracking reference signal PTRS transmission apparatus, comprising a processor, wherein the processor is configured to:
  send uplink grant information, wherein the uplink grant information comprises precoding codeword information; and
  receive a PTRS on an antenna port, wherein the antenna port is determined based on the uplink grant information and a preset rule, the antenna port associated with the PTRS is selected from an antenna port set and the to-be-sent PTRS is one or more of all available PTRSs; and the preset rule comprises: each column of a precoding codeword corresponding to the precoding codeword information and each antenna port in the antenna port set are in a one-to-one correspondence, and antenna ports in the antenna port set that correspond to columns in which non-zero elements in a same row of the precoding codeword are located correspond to a same PTRS.

24. The apparatus according to claim 23, wherein the apparatus further comprises a memory, and the memory is configured to store a program instruction to be executed by the processor.

25. The apparatus according to claim 23, wherein the antenna port set is a scheduling antenna port set.

26. The apparatus according to claim 23, wherein the uplink grant information comprises X bits, and the X bits are used to indicate a number of the antenna port associated with the to-be-sent PTRS.

27. The apparatus according to claim 26, wherein any bit in the X bits is used to indicate a number of an antenna port of one to-be-sent PTRS; the one to-be-sent PTRS corresponds to two antenna ports; and for the any bit, a value of 0 indicates one of the two antenna ports, and a value of 1 indicates the other one of the two antenna ports.

28. The apparatus according to claim 26, wherein X is equal to 2.

29. The apparatus according to claim 23, wherein the antenna port set comprises at least four antenna ports.

* * * * *